United States Patent Office 3,457,049
Patented July 22, 1969

3,457,049
SEPARATION METHODS FOR VOLATILE SOLIDS
William M. Goldberger, Columbus, Ohio, and Jacques Gillot, Lancy-Geneva, Switzerland, assignors, by mesne assignments, to The Battelley Development Corporation, Columbus, Ohio, a corporation of Delaware
Filed Apr. 22, 1965, Ser. No. 450,134
Int. Cl. B01d 7/00; C01g 25/04, 35/00
U.S. Cl. 23—294                                    8 Claims This invention relates to methods for separation of volatile components of a mixture. More particularly, it relates to a method of fractional sublimation by countercurrent contact of a vapor phase with a thin film of solid phase that is ever richer in one component.

Sublimation is recognized as a means for the recovery and purification of components from mixtures of nonvolatile and volatile solids. The method has certain attractive features such as the simplicity of apparatus needed, the ability to process materials in solid form, separation of heat-sensitive materials, and the relatively low temperatures required for processing enabling the separation of heat-sensitive materials which might suffer degradation at temperatures above the melting point. However, the application of conventional sublimation processing has been limited to only a few materials which have been found amenable to the technique. One decided disadvantage of conventional sublimation has been that the process is inherently limited to batch-type operations as opposed to a more desirable method of continuous fractionation. Sublimation processing has also been limited to recovery of a volatile material from a large quantity of a nonvolatile impurity. A fairly high degree of separation has been obtained in these cases only because the volatility of the components is quite different. Where substances have similar vapor pressures it is extremely difficult and generally impractical to separate them from simple mixtures within practical temperature ranges by the common methods of sublimation processing. It has been known however, that true fractionation of solid components is theoretically possible for solids which form a homogeneous solid solution rather than a simple mixture of the undissolved pure components. A true solid solution has a significantly different volatility from that of a mixture having an identical over-all composition. The vapor in equilibrium with such a solid solution at any temperature can contain a higher relative amount of the more volatile component than the vapor in equilibrium with a mixture of the components, each being independent and pure solid phases. This change in the relative volatility of the pure components by virtue of forming a solid solution can greatly reduce the number of steps of repeated condensation and sublimation required at different temperatures to obtain a given degree of separation. Despite the fact that theory predicts the desirability of fractional sublimation from solid solutions, difficulty has been encountered in forming solid solutions by direct condensation from mixed vapors because of failure to achieve an equilibrium type of condensation. Another difficulty has resulted from the use of bulk solid phases and consequent slow rates of diffusion in and through the solid phase and consequent long times to achieve equilibrium conditions.

Many applications and uses are foreseeable for an efficient method of separating and purifying volatile solids, particularly where the components to be separated are chemically similar. Many refractory metal extractions involve chlorination and recovery of that volatile chlorides by first condensing them into solid form. The subsequent separation of these volatile solids is in many cases the most costly step in their purification. A convenient fractional sublimation technique has been in great demand for separation of metal chlorides such as those of hafnium and zirconium or niobium and tantalum. One extremely interesting application for a method of fractional sublimation capable of forming solid solutions by direct condensation from mixed vapors would be for the separation of nuclear isotopes which separation presently must be carried out by extremely complicated techniques.

One of the objects of this invention is to provide a process for separation of volatile solids by fractional sublimation.

Another of the objects of this invention is to provide a process wherein repeated condensation and sublimation are effected in a simple manner.

A still further object of this invention is to provide a process for fractional sublimation wherein repeated condensation of a vapor consisting of components to be separated is carried out in a manner that yields for components which are mutually soluble, otherwise known as miscible components, a single condensed solid phase that is a true solution of the components to be separated.

Yet another object of this invention is to provide a process for fractional sublimation wherein condensation is carried out in such a manner as to provide only thin films of condensed solid.

An additional object of this invention is to provide a process for fractional sublimation wherein countercurrent type of contact is maintained between the vapor and solid phases.

Still a further object of this invention is to provide continuous countercurrent contact of the vapor and solid phases in a process for fractional sublimation without the necessity for conveying devices or other mechanically moving parts within the fractionating apparatus.

Another object of this invention is to provide a process for fractional sublimation in which vapors are enriched in the more volatile component that they contain to concentrations exceeding that of the original feed composition by providing constant contact of the vapors of the volatile solids with condensed solids which contain a greater concentration of the more volatile component than a solid phase which would be in thermodynamic equilibrium with the vapor at the temperature of the vapor.

Still another objejct of this invention is to provide a process for fractional sublimation in which condensed solids are enriched in the less volatile component that they contain to concentrations exceeding that of the original feed composition by providing constant contact of the condensed solids with vapors which contain less of the more volatile components than a vapor in thermodynamic equilibrium with the solid at the temperature of the solid.

Various other objects and advantages will appear from the following description of several embodiments of the invention, and the novel features will be particularly pointed out hereinafter in connection with the appended claims.

Briefly described, the process of this invention includes in its scope the introduction of a separable mixture of volatile substances added in the form of vapor, mixed vapor and solid, or as solid to a moving bed of nonvolatile inert solid particles. Provision is made to maintain the temperature and pressure conditions within the bed so that all locations within the bed contain solid and vapor phases of the volatile substances of the feed mixture. Means are also provided to flow the vapor phase countercurrent to the moving bed of solids.

The fractionation which occurs within the process of this invention is a result of relative movement of vapor and solid phases allowing differences in concentration to exist between vapor and solid in contact within the bed which differ from those concentrations dictated by thermodynamic equilibrium of those phases at corresponding temperature. This difference in concentration between phases from that of phases in equilibrium provides the potential or "driving force" for the separation process. Two basic methods can be used to provide the movement of the vapor phase countercurrently to the moving bed of solids. The choice of method would depend on the system of interest. In one method, a temperature gradient is imposed on the bed so that the one region of the bed is maintained cooler than the other region. This temperature gradient results in a gradient of pressure within the bed that is dictated by the corresponding vapor pressures of the components involved and results in movement of vapor into the cooler regions of the bed. In the second method of providing vapor movement, a noncondensable inert carrier gas is passed within the bed to carry vapors of the volatile solids. In this latter mode of operation, no specific temperature gradient is required and the change in temperature with distance from one extreme of the separation zone to the other may be chosen arbitrarily. Thus, it is possible to make a separation under isothermal conditions when using a noncondensable inert carrier gas. In either event, the vapor is introduced under conditions such that condensation of the mixture occurs as a thin film on the surfaces of the inert particles. The thin film deposit of the precipitate is maintained by using a sufficient amount of nonvolatile inert solid in proportion to the precipitated solid phase. The thin film allows diffusion of components through the deposit to be rapid and thereby enhance the attainment of equilibrium between the phases which consequently facilitates repeated near equilibrium steps of condensation-sublimation. When miscible components are employed, the thin film condensate is a homogeneous phase that is a true solution of the volatile components.

A portion of the volatile material introduced to the bed is either in vapor form or partially vaporizes and does not condense immediately, but flows against nonvolatile inert particles which are coated with a condensate that is richer in the more volatile component. The continuous action of vapor flowing countercurrently to the nonvolatile inert coated particles results in an excess of the more volatile component in the regions of the bed in proximity to incoming inert particles. In the portions of the bed remote from incoming inert particles, the moving coated particles become more and more depleted of the more volatile component. Thus the condensate becomes progressively richer in the less-volatile component in the region of the bed remote from incoming inert particles. At the part of the fractionating apparatus in proximity to incoming inert particles, a mixture is withdrawn that is substantially richer in the more volatile component than was the feed mixture. At the part of the fractionating apparatus remote from incoming inert particles, a mixture is withdrawn that is substantially richer in the less volatile component than was the feed mixture.

Figure 1:
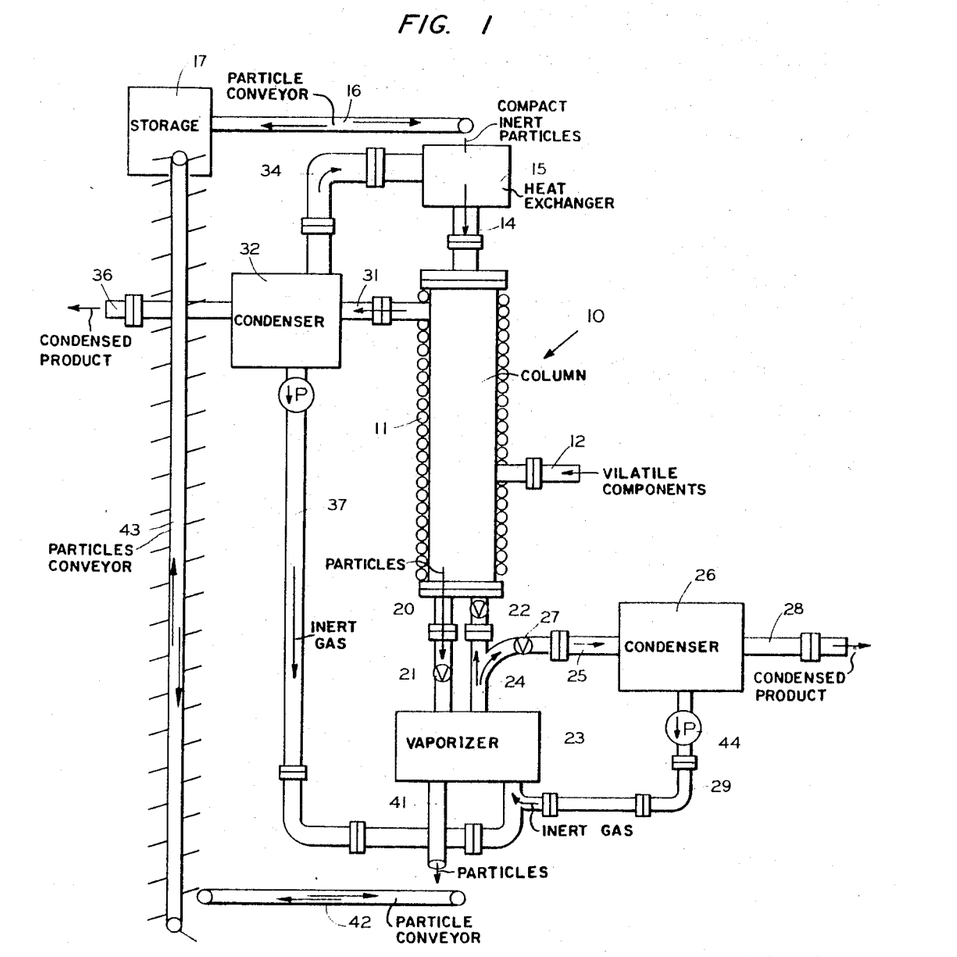
FIG. 1 illustrates schematically an apparatus for carrying out the method of this process.

In the embodiment of the invention illustrated in FIG. 1, the fractionating apparatus comprises generally a simple column 10 of circular cross section. A heater may be provided where necessary as shown at 11.

The volatile components to be separated enter the column generally represented at 10 through feed pipe 12. These components may be in solid form, although a vapor as well as a feed mixture comprising vapor and solid may be used. Inert particulate solids are carried from storage area 17 by conveyor 16 and enter column 10 through inert solids feed pipe 14. Heat exchanger 15 may be used to cool or heat the nonvolatile inert solid particles. The nonvolatile inert particulate solids are fed by gravity through column 10. The downward movement of the mass of nonvolatile inert solids is controlled by valving device 21 located in inert solids drain line 20. The thin film or condensed solid deposited or the nonvolatile inert particles is vaporized in vaporizer generally represented at 23. The clean inert particles pass out of vaporizer 23 through exit 41 and are carried by convenient means such as belts 42 and 43 to storage area 17 where they can be used again. The vaporized material exits through pipe 24 and by means of valve 27 is directed through pipe 25 to condenser 26. A portion of the vaporized material may be directed back into the column through pipe 24 by means of valve 22. When an inert carrier gas is used, it may be introduced into the column through pipe 24. Material condensed at condenser 26 is removed through pipe 28. Any inert gas separated from the condensate at condenser 26 may be returned to column 10 by means of pump 44 and return pipe 29 joining pipe 37 which enters vaporizer 23. The mixture of volatile components from the upper section of the column is continuously removed through pipe 31. A portion of the vapor of the volatile components removed at 31 may be passed through pipe 34 to condense and form a coating on the nonvolatile inert particles entering the column through 15 and entry pipe 14. The remaining material may be condensed at condenser 32 from which final product is obtained through exit 36. Inert gas leaving column 10 with the mixture of volatile components may be recycled and pumped from condenser 32 through pipe 37 entering vaporizer 23.

Figure 2:
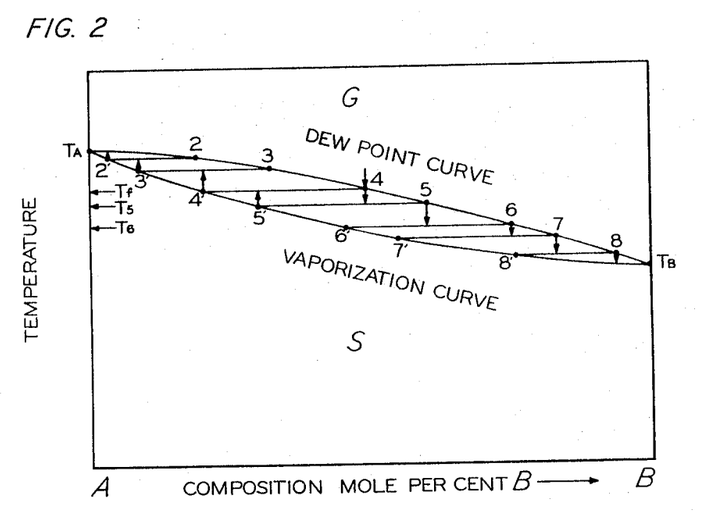
FIG. 2 shows a phase diagram of a simple solid solution in order to illustrate the operation of an embodiment of the process.

An embodiment of the method of this process wherein a temperature gradient is imposed on a moving bed to promote movement of the vapor phase can be described by considering the separation of a vapor containing approximately equal amounts of two volatile components. Perhaps the simplest case is that in which the binary system under consideration is wholly miscible in the solid phase throughout the entire composition range between one pure component and the other. A temperature-composition diagram for this system showing phases that are present at solid-vapor equilibrium is shown in FIG. 2. A binary vapor containing approximately equal mol percent of A and B where B is the more volatile component is to be separated and enters the fractionating apparatus represented by the column 10 of FIG. 1 approximately midway between top and bottom. Generally, separation efficiency is best when the feed material is made to enter the column at a location where the material within the column at the location most corresponds to the composition of the feed. By maintaining the temperature in the column at the feed point location at a temperature below the saturation or dew point of the feed vapor, a portion of the feed vapor will condense on the nonvolatile solid inert particles in the vicinity of the feed entry point. By the term "saturation or dew point" is meant the temperature of initial condensation of solids from the vapor phase under equilibrium condensation conditions.

The dew point or saturation point of the feed, $T_f$, corresponds to the temperature of point 4 on FIG. 2. If the temperature within the column is lower than $T_f$, say, $T_5$ of FIG. 2, a portion of the feed vapors condense to form a thin film of condensed solid on the surface of the nonvolatile inert solid particles. The condensed solids at this point will have the composition corresponding to point 5' and the remaining vapors from the feed that are in contact with this solid will have the composition corresponding to point 5. Because of the lower temperature in the upper regions of the column, and a correspondingly lower pressure, the vapors move upwardly into the cooler regions and are further condensed as shown by the stepwise path from temperature $T_5$ to $T_6$ of FIG. 2. This results in further enrichment of the vapors in the more volatile component B to a composition corresponding to that of point 6 in FIG. 2. This enrichment of the vapors is continuous in regions progressively above the feed location by virtue of continuous partial condensation of vapors as they progress into the cooler regions.

Similarly, the behavior of the condensed portion of the feed as it progresses below the feed location into the higher temperature regions of the column is shown by the stepwise path in the upper portion of FIG. 2.

The stepwise path of composition and temperature change of vapor and solids as shown in FIG. 2 is grossly exaggerated for purposes of explanation. Actually, the large surface area presented by the many small nonvolatile inert particles means that at each point of intimate contact of the vapor with the solid, the vapor can assume an almost identical temperature to that of the solids in its immediate vicinity. Thus, at any elevation within the column, the vapor and the condensed solids that it contacts are almost in thermal equilibrium and the compositional change represented by a single step in the diagram of FIG. 2 becomes infinitesimal. A continuous and gradual change in both temperature and composition results rather than a gross stepwise change. Thus, vapor and solid compositions closely follow the dew point and vaporization curves of FIG. 2 as the solids and vapors flow in opposite directions within the column.

Because the vapor condenses as a very thin film coating of solid on the inert particles under almost equilibrium conditions, the condensed phase is a true solution of the components for a soluble system. The large surface area presented by the particles on which the thin film forms and the rapidity with which thermal equilibrium can be approached at any point within the column permits the operation of the process to be depicted on the equilibumn.

To a large degree, the action of condensation and vaporization within the column is essentially adiabatic. This means that there is no large amount of heat transferred through the walls of the column either to or from the surroundings. When vapor in the column condenses to form a film on the surface of nonvolatile inert particles previously coated with condensate, the heat of condensation that is liberated serves to vaporize the more volatile component in the previously condensed film. As in distillation, a component condensing from the vapor serves to volatilize another component into the vapor in a relative amount that is established by their relative latent heat of condensation and the heat losses or additions to the column.

It is important to note, also, that the flow of solids downward and the flow of vapors upward are both continuous and uninterrupted at any time during the operation. Because of this, the temperature from top to bottom within the column changes very gradually from a lower to a higher temperature value. It is evident from the condensation characteristics of saturated vapors that the composition of the vapor becomes increasingly richer in the more volatile component as the vapor rises upward in the column. There is a corresponding increase in the relative amount of the more volatile component in the condensate at higher elevations within the column. The net effect of this action in the section of the column above the feed point is that the rising stream of saturated vapor is continually being brought into contact with condensed volatile solids that are richer in the more volatile component because these solids are moving downward from the lower temperature regions where the concentration of the more volatile component is greater. This action in the section of the column above the feed location is exactly analogous to the action in the enriching section of the distillation column, and thus a similar refluxing or enriching action is obtained. Thus, the vapors leaving the column at the upper part are far richer in the more volatile component than was the feed mixture. A similar action occurs in the section below the feed location, and this section of the fractionator is analogous to the stripping section of the usual distillation column. In the section below the feed location, the rising stream of vapor from the higher temperature regions causes vaporization of the more volatile component contained in the coating of condensed phase on the nonvolatile inert particles. Thus, the solid condensate moving downward in the stripping section becomes richer and richer in the less volatile solid and the temperature-composition relation is approximately that of the vaporization curve of FIG. 2. The less volatile component can therefore be drawn from the bottom of the section in far greater purity than it was in the feed mixture. In this manner, the components of the feed can be separated in a continuous and countercurrent manner.

The efficiency of the processing can be enhanced by the introduction of reflux at the top and bottom sections of the column. At the top of the column, a portion of the more volatile component can be condensed on the cold inert particles entering the column. This provides a thin film of solid phase rich in the more volatile component to contact vapor similarly richer in the more volatile component. At the bottom of the column, a portion of the emerging solid can be revaporized to provide a vapor rich in the less volatile component to contact the descending particles and strip them of the more volatile component as they move countercurrently to the vapor in the hotter regions of the column.

In another embodiment of the process, fractionation and separation of components can be carried out without a temperature gradient. The separation is made possible by use of a noncondensable inert carrier gas to promote the necessary countercurrent contact of solid and vapor phases over a large surface area to achieve approximately equilibrium conditions between phases. An inert carrier gas enters the column at the bottom, and moves upward, entraining the vapors of the volatile components. A small flow of this carrier gas can also be used for introducing the feed at the feed point. The distribution along the column of the temperatures of the moving solid particles can be fixed arbitrarily. A particular case of this is the case where the column is isothermal, that is to say the whole coulmn is at the same temperature. Generally the highest possible temperature is chosen because the mobility of atoms, ions, and molecules in the solid phase increases rapidly with temperature.

Figure 3:
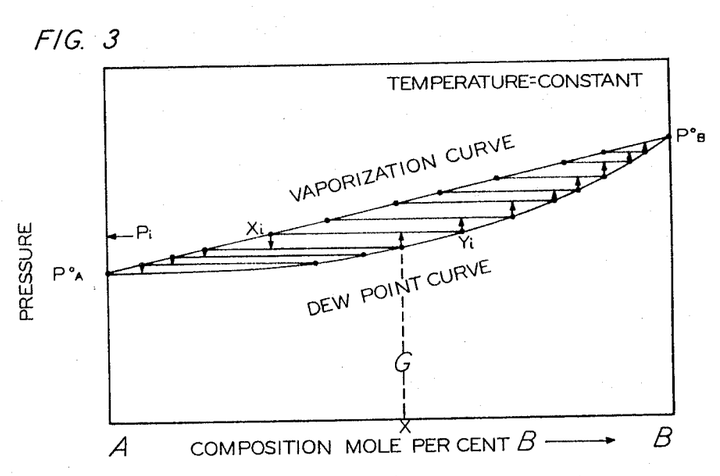
FIG. 3 shows a phase diagram of another simple solid solution to illustrate the operation of a further embodiment of the process.

In the case where the separation is carried out under isothermal conditions, the total pressure in the separation apparatus can be maintained essentially constant. The partial pressures of the individual components do, however, vary with composition as does the sum of these partial pressures. Therefore, a gradient of pressure of the volatile components exists within the separation zone that decreases with increasing concentration of the less volatile component. When feeding a moving bed of inert solids through a separation apparatus having a columnar shape, the less volatile component is carried toward the lower regions of the column causing a pressure gradient of the volatile component which gives higher pressures in the upper regions of the column and lower pressures at the lower regions of the column. The isothermal operation can be depicted on a pressure-composition equilibrium diagram for the hypothetical system of components A and B as shown in FIG. 3. The pressure ordinate of FIG. 3 is the pressure corresponding to the sum of the individual component partial pressures and not the total system pressure which may be fixed at any desired value due to the presence of a noncondensable inert gas. A vapor feed of composition X, shown in FIG. 3, maintained above its dew point temperature (not shown on FIG. 3) is brought into isothermal column that is operating at a temperature below the dew point temperature of the incoming feed mixture. This results in the formation of a thin film of solid condensate from a portion of the feed vapor. The condensate has a composition corresponding to point $X_i$ enriched in the less volatile component A, whereas the remaining uncondensed vapors from the feed mixture have the composition $Y_i$, enriched in the more volatile component B. As the enriched vapor is carried upward by the inert carrier gas into the upper regions of higher pressure, there is further condensation and enrichment as shown in FIG. 3. Thus, there is a continuous change in composition of vapor closely approximating the dew point curve of FIG. 3. Similarly, as the condensed solids are carried downwardly on the surface of the inert solid particles into regions where the sum of the partial pressures is lower, there is a gradual and continuous vaporization of the more volatile component which causes the composition of the condensed solid phase downwardly through the column to approximate the vaporization curve of FIG. 3. The net effect is repeated equilibrium condensation-sublimation driven by the difference in composition. The gas carried upwardly by the inert gas carrier is continually enriched in the more volatile component by repeated condensation-sublimation. Similarly, the thin coating on the solid particles moving downwardly countercurrently to the rising gas is being continually enriched in the less volatile component by repeated condensation-sublimation. The thin film on the solid particles being continually depleted in the more volatile component will seek to equilibrate with a gas leaner in the more volatile component, the net effect is that vapor of the more volatile component ascends to the top by repeated steps of condensation-sublimation as shown by those isobars above $X_i-Y_i$ in FIG. 3. Finally, almost pure B ascends from the top of the column. This is made to pass through a condenser and is taken off as B-rich solid. A portion of the B-rich solid is used to coat the inert particles entering the system so as to provide reflux. This gives improved efficiency for the processing by continual contact of solid becoming less rich in the more volatile component with a vapor phase becoming continually enriched in the more volatile component. At the base of the fractionation column, a vaporizer may steadily provide reflux of vapor rich in the less volatile component A. The vapor carried upwardly by an inert carrier gas contacts the downwardly moving solid particles coated with condensate richer in the more volatile component B and the continual steps of condensation and sublimation take place, so that the net effect is to continually increase the amount of the more volatile component in the vapor rising in the column and increase the amount of the less volatile component A descending on the downwardly moving solid particles. A portion of vaporized A-rich material is not used as reflux but can be carried on to a condenser and recovered.

Because the mass of the bed of particulate material is much larger than the mass of the volatile components present in the column, it has a much higher heat capacity. Therefore, one advantage of the isothermal mode of operation is that the bed can be recycled without having to heat or cool it outside the column. For example, the film of condensate can be extracted from exiting inert particulate material by dissolution of sublimation at the temperature of the bed and reduced pressure. Particles entering the column may be coated by spraying or other means.

It is important to note that the isothermal process is simply one case of the more general process in which the distribution of temperature along the column may be chosen arbitrarily. This ability to select a desired gradient of temperature or operate isothermally is made workable by the use of a carrier gas. In this way, countercurrent movement is achieved of a vapor continually depleted of the less volatile component by the carrier gas causing it to be brought into contact with a solid ever richer in the more volatile component. The feature of countercurrent movement is combined together with the previously described advantages that can be obtained from the large surface area of the thin film compositions presented by the downwardly moving particles.

The process of this invention has been found particularly useful for the separation of compounds which form solid solutions upon condensation from mixed vapors. This is because the composition of a vapor in thermodynamic equilibrium with a solid solution varies with the composition of the solid solution even under isothermal conditions whereas the composition of a vapor in equilibrium with a simple mixture of the volatile solids is unaffected by the over-all composition of the solids. In the latter case, the composition is affected only by temperature. Thus, compounds which are wholly miscible and form solid solutions can be separated virtually completely in two ways by the method of this invention. This includes the operation with a temperature gradient but without a carrier gas and also the isothermal method or the use of an arbitrarily chosen temperature gradient and using a carrier gas.

Figure 4:
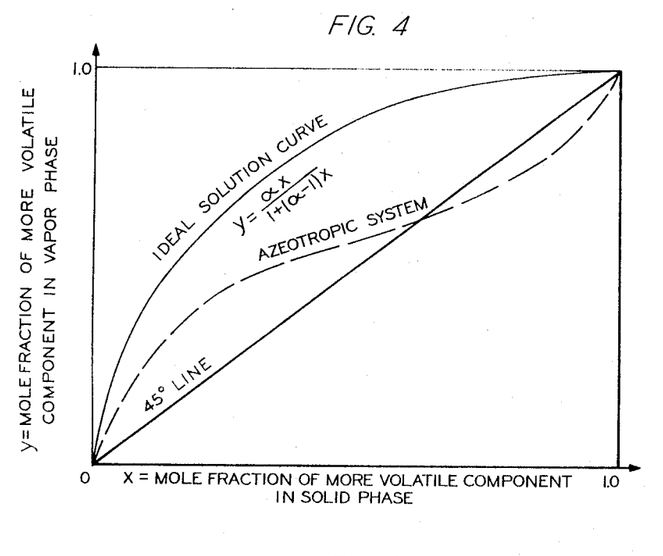
FIG. 4 shows another method of illustrating an embodiment of the process.

For ideal solutions (those which behave as predicted by Raoult's Law) a virtually complete separation of a two-component system can be achieved in a single column apparatus of this invention when the column is long enough to provide a great many theoretical stages of contact. Raoult's Law states that the partial pressure exerted by a component at equilibrium in the vapor phase is equal to the product of its mole fraction in the solid phase and its pure component vapor pressure at the temperature of the solution. For ideal solutions, the concentration of the more volatile component in the vapor will always exceed that in the solid. FIGS. 2 and 3 represent phase diagrams for such systems and show that with sufficient stages of equilibrium solid-vapor contact, a complete separation of the components of the ideal system can be achieved. FIG. 4 shows another method for plotting the equilibrium data useful in analyzing a separation process.

In FIG. 4, the concentration of the more volatile component in the equilibrium vapor is shown plotted against the concentration of that component in the solid. The heavy line indicates a plot for an ideal system and the curve for that line can be determined by the equation $$Y=\frac{\alpha X}{1+(\alpha-1)X}$$

where:

$\alpha$=the ratio of the vapor pressure of the more volatile component to that of the less volatile component at the same temperature X=mole fraction of the more volatile component in the solid phase Y=mole fraction of the more volatile component in the vapor phase FIG. 4 is not a phase diagram and the equilibrium curve shown could represent any of the cases described, namely: the cases of operating with a carrier gas under isothermal or nonisothermal conditions as well as the case of operating without a carrier gas. The ease of separation is directly related to the area between the equilibrium curve and the 45° line. A larger relative volatility ($\alpha$) between the components would correspond to a larger area indicating an easier system to separate.

Actual solutions deviate positively or negatively with respect to Raoult's Law and if their equilibrium relationship is known, it can be plotted in the form of FIG. 4. Note that an actual system which exhibits a positive behavior with respect to Raoult's Law would be easier to separate than if Raoult's Law behavior were followed. On the other hand, some systems deviate to the extent that at a certain mid-range composition there is no difference in vapor-solid composition. Such systems are analogous to the azeotropic systems known in the art of liquid-vapor fractionation. Azeotrope composition represents the limits of separation that can be achieved by a simple fractionating process.

It is significant therefore that the more cheimcally similar the constituents, the more nearly ideal the solution and the less likelihood of forming azeotropes. Because of the vast number of fractionating stages able to be provided by the process of this invention, this invention is particularly suited for separating chemically similar components even though they may exhibit only a small difference in their volatility. Thus, the separation of various nuclear isotopes including radioactive isotopes is a very practical application of this invention.

Of course, the method of this process can be used for solid solutions comprising any number of soluble components. A solution of components would be withdrawn from one portion of the column and a pure component from a second portion of the column. The solution of components thus withdrawn would merely be made to enter another fractionating column for similar separation. Thus, to separate each component of a system of $n$ soluble components, $n-1$ columns would be provided.

In another modification of this process, a batch-type separation can be accomplished similar in concept to batch-wise distillation. In this case, a fixed amount of volatile components is introduced to the column and fractionated. A constant flow of the nonvolatile inert solids is provided and product streams can be drawn intermittently or continuously during the fractionation. Because no volatile component is added, the compositions in both the vapor and solid at any location in the column will change with time. This type of batch-wise separation can be accomplished with a carrier gas or without a carrier gas if a temperature gradient is maintained.

For purposes of experiment, the fractionating apparatus can also be operated at total reflux of the volatile components, i.e., no withdrawal of volatile components from the system. A total condenser and total revaporizer may be supplied allowing the inert gas and inert solids to move through the apparatus without depleting the inventory of volatile components.

Solutions of two components have been discussed because of their basically simple nature. The fact that such desirable results for separating two or more components from each other can be obtained by condensation into solid solutions within the column does not limit the process only to separable components that form solid solutions. Separation can still be achieved in another embodiment by the prescribed method of the disclosed embodiments for components that are immiscible in the condensed phase and do not form solid solutions. The column operation is entirely the same in this case; however, the coating of solids that forms on the inert particles consists of two distinct phases rather than a single homogeneous solid phase of the two or more components. In this case, the separation is limited by the relative saturating vapor pressures of the components. The column, instead of fractionating the components as such, can be used to strip the more volatile components away from the less volatile, thus obtaining a high purity of the less volatile at the bottom but a mixture of components at the top. The composition of the mixture at the top will depend on the relative volatility of the components.

There are a number of process condiions that will affect the operability of the process and the manner of the condensation and thus the degree of separation that is achieved within the apparatus. These factors include the relative amount of inert solids that are circulated through the apparatus with respect to the amount of volatile feed material. In addition, the size of the inert particles is important. If a temperature gradient is used, without use of an inert carrier gas, the degree of separation will be limited by the temperature at the extreme ends of the separation column. For isothermal operations, carrier gas flow rates should be selected to match the operating conditions and the separation will depend on the amount of product drawn relative to that refluxed back to the column. Rates of diffusion are increased at higher temperature and generally it is best for isothermal operation to operate as near to the melting point of the lower melting component as possible. For example, it was noted in actual runs that, if at any point in the column where solids are present, the temperature exceeds the melting point of the solids, then a liquidus film forms on the inert solids and they do not flow freely. It was also observed in tests that there is a tendency for the solid particles to adhere to each other when they become coated with the condensed volatile solid. This action can prevent the desired free flow of the solids unless suitable design conditions are used. The tendency for the solids to bridge after receiving a coating as described can be eliminated by increasing the relative amount of the inert solids with respect to the condensable components held within the column. Also, use of inert particles of larger diameter reduces the adhesion effect. Use of a vibrating action in some cases is sufficient to insure a free-flowing action.

Example 1

It was desired to separate components forming a homogeneous solution in a column operating with a flow of carrier gas and with a temperature gradient imposed. To measure the separating efficiency of the process, it was informative to determine the number of theoretical stages for a given separation. The terms "theoretical stage" or "stage of equilibrium contact" are conventionally used by those familiar with separation processes as a unit to measure the separating efficiency of the process and they do not refer to an actual or physical part of the apparatus. Thus, a column, such as the conventional packed column used for distillation, may be described as being equivalent to ten "theoretical stages." The number of theoretical stages for a given separation is readily determined by calculation when the equilibrium phase relationships for the various compositions are known. The effectiveness of the column design is given by the height of the column that is equivalent to one theoretical stage.

Figure 5:
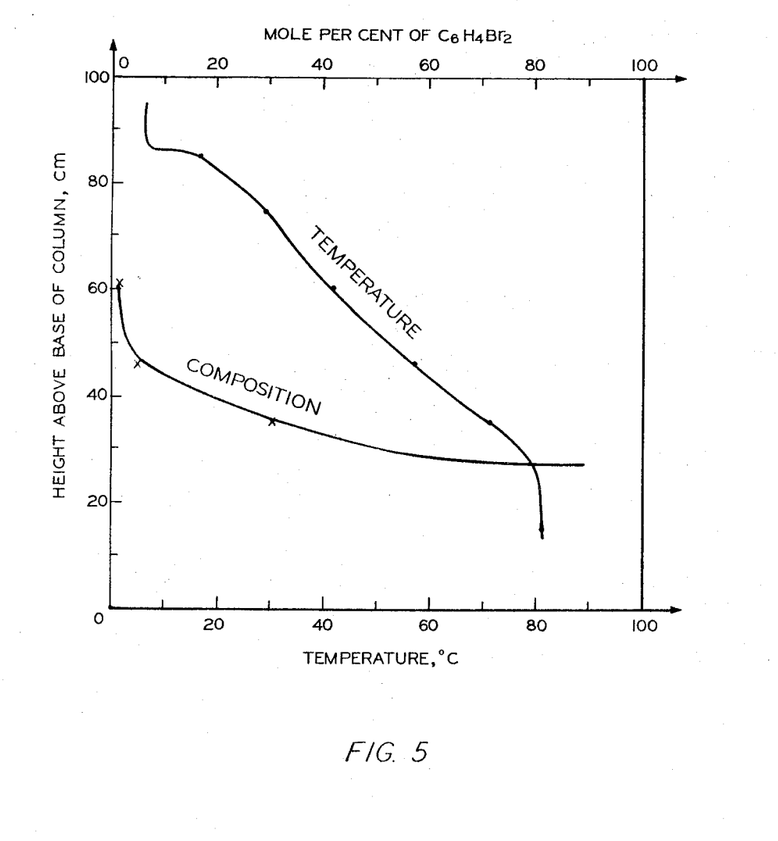
FIG. 5 shows experimental conditions that have been achieved during the operation of applicant's process for separation of volatile components.
Figure 6:
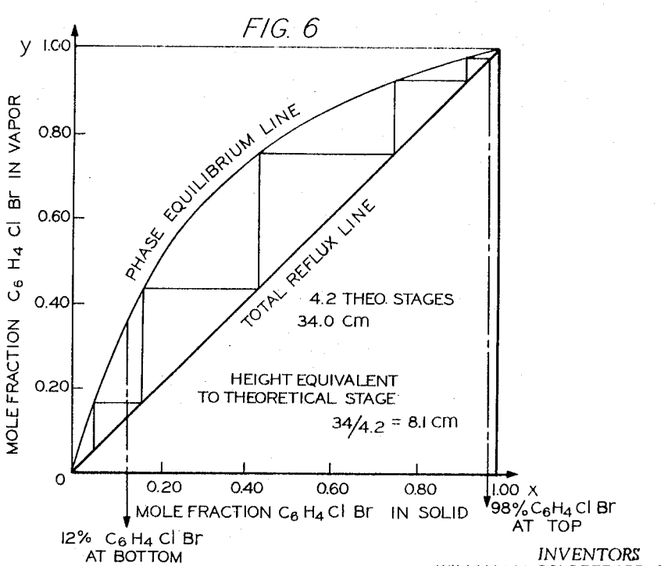
FIG. 6 illustrates the high degree of separation of volatile components that can be achieved by the method of applicant's process.

An experiment was made to separate para-bromochlorobenzene and para-dibromobenzene under a condition of total reflux (as opposed to continuous feed and withdrawal of all components) in the column of the type shown in FIG. 1. Sand particles having an average diameter of 0.3 to 0.4 mm. were fed by gravity slowly downward as a "moving bed" in a column of glass tube having a diameter of 21.5 mm. The downward velocity of the sand was controlled at 0.90 cm./min. Air calculated to flow at a velocity of 4.5 cm./second in a column free of solids was passed upward through the downwardly moving sand. Heating coils were wrapped at different spacings along the column to provide a temperature gradient. At the start of the experiment, 1.05 grams of para-dibromobenzene and 1.00 gram of para-bromochlorobenzene were introduced into the column. During the experiment, samples of condensate were removed from the column and analyzed by determination of melting points. FIG. 5 shows a plot of the longitudinal temperature and composition profiles within the column during the experiment. A composition of 98 percent of the more volatile $C_6H_4ClBr$ (para-bromochlorobenzene) was found near the top of the column. FIG. 6 shows the calculated phase relationship for the components of this experiment based on vapor-solid phase data given in the literature (Walsh, P. N., and Smith, N. O., Journal of Physical Chemistry, 65, 718 (1961)). The ordinate of FIG. 6 represents the mole fraction of $C_6H_4ClBr$ in the vapor. The extreme compositions determined by experiment to correspond to the volatile components contained at opposite ends of column are shown by the vertical arrows. Simple graphical calculation shows that 4.2 theoretical stages were provided by the column for the test separation and that the height equivalent to a theoretical stage was 8.1 centimeters. This indicates that a high degree of separation is obtainable by the method of this process. A large number of theoretical stages can be provided for a given column height, and the height equivalent to a theoretical stage is low.

It is apparent from these data that enrichment occurred by virtue of the refluxing and stripping action obtained in the column. These effects were in turn derived from the fact that the solid phase was a homogeneous solution of the two components and not a simple heterogeneous mixture of two pure solid phases. For in this latter case, under the conditions of temperature imposed, a purity of only 83 percent para-chlorobromobenzene could be achieved rather than the purity of 98 percent that was actually found.

Example 2

An operation was made in which it was sought to carry out fractional sublimation under isothermal conditions. The column was equipped as previously described in Example 1 herein with the exception that a jacket heater providing a constant temperature throughout the bed was used in place of the previously described gradient heater. The moving bed comprising small glass beads having an average diameter of 0.42 to 0.59 mm. was fed by gravity with a controlled velocity of 50 cm./hr. The temperature of the moving bed was maintained at 280° C. Zirconium and hafnium tetrachlorides were introduced to the column by vaporizing them in nitrogen. The nitrogen was allowed to contact the chlorides contained in a heated tube until $1.13 \times 10^{-2}$ mole $ZrCl_4$ (2.64 g.) and $0.78 \times 10^{-2}$ mole $HfCl_4$ (2.51 g.) were vaporized. The upward flow rate of the nitrogen entrainer gas was 1700 cm.³/hr. For this experiment, the column operated at total reflux and a period of 3 hours was allowed to reach a steady state condition after feeding was completed. A set of gas samples was then withdrawn at several locations along the column over a period of thirty minutes. The samples had the compositions shown below:

| Level of sampling point above bottom of the heating jacket, cm.: | Molar composition of sample, percent $ZrCl_4$ |
|---|---|
| 52 | 38.5±4.0 |
| 32 | 57.3±3.0 |
| 12 | 68.7±0.8 |

The thickness of the condensed film during the experiment was calculated to be of the order of 0.1 micron.

The operation established that the more volatile $HfCl_4$ could be separated to the top of the column by countercurrent fractional sublimation without relying on a temperature gradient in the column.

Example 3

A series of three runs were made under identical conditions to determine the reproducibility of fractional sublimation carried out by the method of this process under isothermal conditions. The column used for these runs was 150 cm. long and was provided with 13 sampling positions spaced 10 cm. from one another. Cold incoming particles of inert material were heated by 8 immersion heaters provided within a zone at the very top 10 cm. of the column. External heating tapes located along the length of the column maintained constant operating temperature. The moving bed comprising small glass beads having an average diameter of 0.42 to 0.59 mm. was fed by gravity with a controlled velocity of 0.685 cm./min. The temperature of the moving bed was maintained at 50° C. Feed material comprised para-bromochlorobenzene ($C_6H_4ClBr$) and para-dibromobenzene ($C_6H_4Br_2$). The feed components were vaporized in nitrogen until 2 gm. of each component of the feed were vaporized. Carrier gas flowed to the column at the rate of 1 liter/min. As in Example 2, the column operated at total reflux and a period of 3 hours was allowed to reach a steady state condition after feeding was completed. Gas samples were then withdrawn at the respective sampling locations and analyzed by determination of freezing point. The compositions of samples withdrawn from various locations within the column are shown below:

| Distance above bottom sample tube, cm. | Vapor composition, mole percent $C_6H_4Br_2$ | | |
|---|---|---|---|
| | Run No. | | |
| | 1 | 2 | 3 |
| 0 | 99+ | 99+ | 99+ |
| 10 | 89 | 89 | 89 |
| 20 | 78 | 80 | 78 |
| 30 | 57 | 57 | 57 |
| 40 | 50 | 50 | 47 |
| 50 | 43 | 43 | 43 |
| 60 | 37 | 37 | 37 |
| 70 | 27 | 27 | 27 |
| 80 | 14 | 14 | 11 |
| 90 | 6 | 9 | 6 |

Samples taken at locations above 90 cm. all less than 5 per cent and below the limit of accurate analysis by freezing point methods.

The data for the runs show the high degree of separation that can be obtained by the method of this process and further show the reproducibility with which the separation can be obtained.

Example 4

An experiment was made to carry out fractional sublimitation under isothermal conditions wherein continuous operation or continuous feed and withdrawal of products was maintained. The column was that hereinabove described for Example 3. The moving bed comprising small glass beads having an average diameter of 0.94 mm. was fed by gravity with a controlled velocity of 1.21 cm./min. The temperature of the moving bed was maintained at 50° C. throughout the separation zone. In a short segment at the very top of the column, there was maintained a gradient of temperature decreasing continuously to 40° C. to provide a reflux condenser. Feed material comprised parabromochlorobenzene ($C_6H_4ClBr$) and para-dibromobenzene ($C_6H_4Br_2$). Nitrogen was used to carry vapor of the feed components from a heated tube. The flow rate to the column of $C_6H_4ClBr$ entrained in nitrogen was 1.42 liters/minute. For $C_6H_4Br_2$, the flow rate was .42 liter/minute. These flow rates were calculated to provide the feed entry location at about the center of the column with a vapor containing 45.4 mole percent of $C_6H_4Br_2$. Carrier gas flowing at the rate of 1 liter/minute entered the stripping section at the base of the column. The column was allowed to operate continuously for a period of 2 days. Gas samples were withdrawn from top and bottom locations of the column and analyzed by determination of freezing point. These determinations showed 85 mole percent of the less volatile $C_6H_4Br_2$ at the bottom of the column and 61 mole percent of the more volatile $C_6H_4ClBr$ at the top of the column.

The experiment demonstrated that fractional sublimitation can be carried out on a continuous basis in a column operating under isothermal conditions. Manipulating of operating variables, particularly those concerned with reflux conditions would improve the magnitude of the separation obtained.

The novel features of this invention as disclosed by the examples and disclosures hereinabove set forth have been generally illustrated by a process characterized by the ability to separate volatile solids by fractional sublimation by continual countercurrent contact of a vapor phase ever depleted in one component with a thin film of solid phase, that may be a solid solution, ever richer in one component, the thin film of solid phase providing rapid diffusion in the solid phase and close approach to equilibrium between vapor and solid.

The above examples are intended to be illustrative of applicant's process but are not intended to be limiting thereof. Many additional applications and combinations will be immediately obvious to those skilled in the art.

One advantage of this invention is that a process is provided wherein continuous fractional sublimation may be carried out without the use of moving parts within the fractionater column.

Another advantage of this invention is that a process is provided wherein separation by fractional sublimation is purely physical as opposed to chemical.

Still another advantage of this invention is that a process is provided for fractional sublimation at constant temperature.

Yet another advantage of this invention is that a process is provided for fractional sublimation wherein components can be recovered in almost pure form.

An additional advantage of this invention is that a process is provided for fractional sublimation wherein maximum thermal efficiency is obtained by convenient countercurrent contact.

Still another advantage of this invention is that a process is provided for fractional sublimation wherein multistage operation is obtained within a single column-type apparatus and is carried out in a continuous operation suited to automated operation and large-scale production.

Yet another advantage of this invention is that a process is provided for frctional sublimation wherein a large number of fractionating stages are provided to give practical separation of components having only a slight difference of volatility.

Many other uses and advantages for applicant's process will be apparent to those having a need for separating volatile solids by continuous fractional sublimation.

It will be apparent that new and useful methods for thin film separation of volatile solids have been described. Although several preferred embodiments of the invention have been described, it is apparent that modifications may be made therein by those skilled in the art. For example, in the embodiments hereinabove described closely packed nonvolatile inert particulate material moves downwardly in a vertical column. The scope of the invention would necessarily include upwardly movement in a vertical plane or horizontal movement of a bed of closely packed nonvolatile inert particulate material. In either case, vapor would flow countercurrently to the above-mentioned moving bed. In addition, although reference has been made to nonvolatile inert particulate material, the described particulate material may comprise pure component comprising the least volatile material being stripped from the column.

What is claimed is:

1. A process for enriching a substance composed of a mixture of at least two sublimable components comprising:
    (a) introducing said substance into a confined compact moving column of substantially inert nonvolatile particulate material;
    (b) causing vapors within said column to flow countercurrently to the flow of said particulate material;
    (c) providing temperatures and pressures within said column disposed to effect a solid phase and a vapor phase of said substance in constant and direct contact with one another, said major phase being at its saturation or dew point condition throughout said portion, said temperatures and pressures being further disposed to provide solid precipitated on the said compact inert material and vapor phases enriched in the least volatile components of said substance in a region of the column displaced from the point of introduction in the downstream direction of flow of said column and solid precipitated on the said compact inert material and vapor phase enriched in the more volatile components of said substance in a region of the column displaced from the point of introduction in the upstream direction of flow of said column the said introduction of said substance being intermediate the region of solid precipitation of a precipitate enriched in the least volatile component and a precipitate enriched in the more volatile component on the inert material, and
    (d) removing substance enriched in said less volatile components at at least one point displaced in the downstream direction of flow of said column from said point of introduction and removing substance enriched in said more volatile components at at least one point displaced in the upstream direction of flow of said column from said point of introduction.

2. The method of claim 1 wherein said substance is introduced into said column continuously.

3. The method of claim 1 wherein said temperature in said column is varied to form a gradient being highest in the downstream direction of flow of said column and lowest in the upstream direction of flow of said column so as to effect said enriched phases.

4. The method of claim 1 wherein said column is maintained at substantially the same temperature and said least volatile components are disposed to form solid solutions with said more volatile components.

5. The method of claim 1 wherein an inert carrier gas is caused to flow countercurrently through said column so as to cause said vapors to flow countercurrently.

6. The method of claim 1 wherein said substance contains at least two components that are disposed to form a solid solution, at least one of these being among the least volatile components and at least one being among the more volatile components.

7. The method of claim 1 wherein said substance contains only two sublimable components one having a greater volatility than the other.

8. The method of claim 4 wherein an inert carrier gas is caused to flow countercurrently through said column so as to cause said vapors to flow countercurrently and effect said enriched phases.

References Cited

UNITED STATES PATENTS

| 2,537,044 | 1/1951 | Gtarbo | 62—14 |
| 2,560,469 | 7/1951 | Ogorzaly | 62—14 |
| 2,561,720 | 7/1951 | Alleman | 62—14 |
| 2,580,635 | 1/1952 | Winter | 23—294 |
| 2,688,853 | 9/1954 | Hachmuth | 62—14 |

NORMAN YUDKOFF, Primary Examiner

U.S. Cl. X.R.

23—87, 326